United States Patent [19]

Yoneda

[11] Patent Number: 5,374,800

[45] Date of Patent: Dec. 20, 1994

[54] METHOD FOR WELDING OF FUEL ROD

[75] Inventor: Eiji Yoneda, Tohkai, Japan

[73] Assignee: Mitsubishi Nuclear Fuel Co., Tokyo, Japan

[21] Appl. No.: 154,559

[22] Filed: Nov. 19, 1993

[30] Foreign Application Priority Data

Nov. 20, 1992 [JP] Japan ................... 4-312467

[51] Int. Cl.⁵ .................... B23K 11/00; G21C 3/10
[52] U.S. Cl. .................... 219/117.1; 376/451
[58] Field of Search ............ 219/72, 74, 137 R, 117.1; 376/451

[56] References Cited

U.S. PATENT DOCUMENTS

| | | | |
|---|---|---|---|
| 3,842,238 | 10/1974 | Boyko et al. | 219/137 R |
| 3,952,395 | 4/1976 | Crossman et al. | 219/117.1 |
| 4,003,788 | 1/1977 | Boyko et al. | |
| 4,097,712 | 6/1978 | Bezold | 219/72 |
| 4,106,171 | 8/1978 | Basiulis | 219/72 |
| 5,251,247 | 10/1993 | Sahlin et al. | 376/451 |

*Primary Examiner*—Clifford C. Shaw
*Attorney, Agent, or Firm*—Oblon, Spivak, McClelland, Maier, & Neustadt

[57] ABSTRACT

A resistance welding method for a fuel rod is presented in which the gas seal opening is closed with a sealing material of the same composition as the end plug material. The method enable to perform welding stably in a pressurized welding chamber, and the process is amenable to automation. The sealing material body is made of a wire, and is pressed against the conical shaped opening provided on the end plug. The welding method avoids contaminating the weld with undesirable impurities from the electrode material, and the welding operations is designed so that there is no need to reshape the end of the electrode or adjust the gap between the sealing material and the seal opening.

20 Claims, 1 Drawing Sheet

METHOD FOR WELDING OF FUEL ROD

BACKGROUND OF THE INVENTION

1. Field of the Invention

The present invention relates to a technique of resistance welding of a seal opening provided on an end plug of a fuel rod containing fuel pellets and pressurized to a specific gaseous pressure with an inert gas filled through the seal opening.

2. Technical Background

In general, a fuel rod for use in a light water pressurized reactor is made by packing fuel pellets inside a fuel tube, and the ends of the fuel tube are fitted with end plugs and the end plugs are joined to the ends of the fuel tube by means of joining techniques such as the tungsten inert gas (TIG) welding. Further, there is a (gas) seal opening disposed on one of the two end plugs for filling the fuel tube interior with an inert gas under pressure. The gas seal opening is sealed off, by joining methods such as TIG welding, so as to maintain the gaseous pressure of the fuel tube at a specific value.

TIG welding for general welding applications is performed in an open atmospheric pressure, and an inert gas is circulated so as to protect the tungsten electrode and the object to be welded from the chemical effects of the ambient air atmosphere, and to provide cooling.

However, because the welding of the seal opening of a fuel rod must be carried out in a pressurized welding chamber, it is difficult to flow the inert gas between the welding object and the tungsten electrode. It is also difficult to generate the welding arc in the pressurized welding chamber, and it is often necessary to overheat the electrode in the initial stage of the welding operation. Accordingly, when performing TIG welding in a pressurized welding chamber, there is a rapid wear of the tungsten electrode, and depending on the welding conditions, there is a danger of inclusion of the tungsten in the metal of the weld. It is not desirable that tungsten becomes mixed in the weld, because when it happens, the weld quality becomes degraded, for example, by the loss of the corrosion resistance of the weld. Therefore, it was necessary that the welding operation be carried out with utmost care. The tungsten electrode suffered shape changes after each welding operation, due to such factors as melting and vaporization of part of the electrode, thus necessitating adjustments in the arc gap for every welding as well as frequent exchanging of the electrode for grinding of the electrode so as to reshape the tip to the required shape.

SUMMARY OF THE INVENTION

The present invention was made in view of the technical problems described above, by developing a method for resistance welding in a welding chamber of a gas seal opening provided on an end plug, comprising the steps of: (a) pressing a sealing material body against the gas seal opening; and (b) passing a current through contact electrodes disposed on the sealing material body and on the fuel tube so as to heat a joint between the sealing material body and the end plug to cause resistance welding of the joint.

According to the welding method of the invention, welding is performed while Dressing a sealing material body, preferably made of the same material as the end plug, against the gas seal opening of the end plug, and passing a current between the end plug and the sealing material body, thereby heating the end plug and the sealing material body by specific resistance and contact resistance heating effects. The temperature rises until the joint is hot enough to form a metallurgical bond between the end plug and the sealing material body, and due to the pressing applied, resistance welding of the joint is achieved smoothly.

The technique allows the welding to be performed, even under the condition of an inert gaseous pressure, stably in terms of the bead position and the melt-in shape, and enables to continuously weld a plurality of end plugs. The technique is further superior to the conventional TIG welding because it enables to eliminate shape adjustments of the tungsten electrode and gap setting between the tungsten electrode and the end plug before undertaking every welding operation. A further feature of the invented welding method is that it enables automation of the welding process of the fuel rod.

A preferred method is to include the steps wherein prior to the steps (a) and (b), the fuel tube is readied for loading fuel pellets, and is loaded with a plurality of fuel pellets.

The method of resistance welding is thus able to eliminate the danger of including the electrode material such as tungsten in the welded metal; to eliminate the necessity for operational adjustments and confirmation required before undertaking each welding operation, such as adjusting the arc gap and reshaping of the electrode which were required in the conventional TIG welding.

In a further embodiment of the invention, the welding is conducted in a chamber filled with an inert gas to a specific gaseous pressure which is equalized through the gas seal opening with the inner gaseous pressure of the fuel tube.

Through the embodiment of the invention, stable continuous welding can be obtained even under pressurization.

PREFERRED EMBODIMENTS

Figure 1:
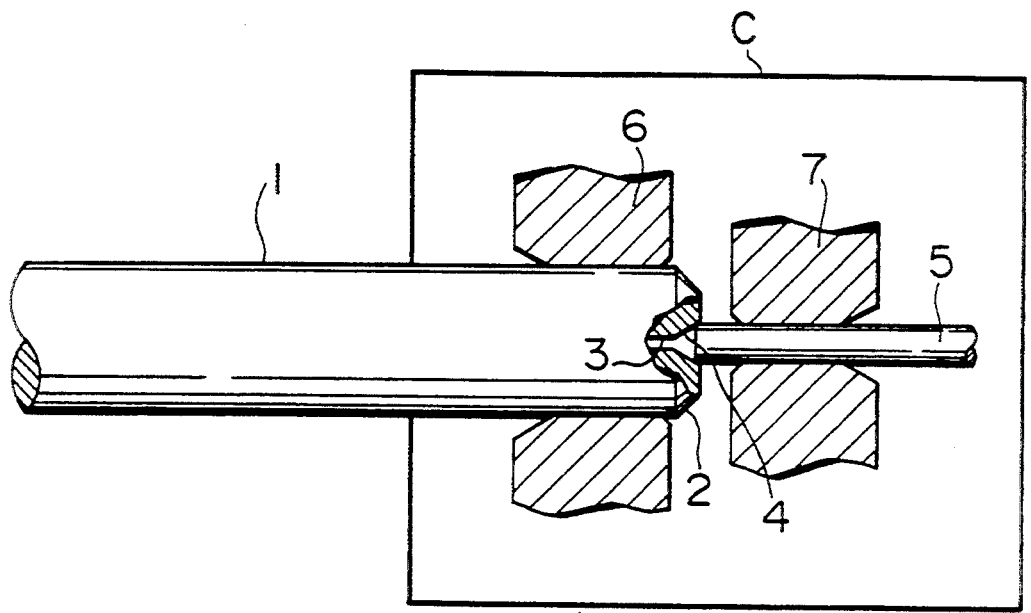
FIG. 1 is illustration of the pressing-assisted resistance welding method of the present invention.
Figure 2:
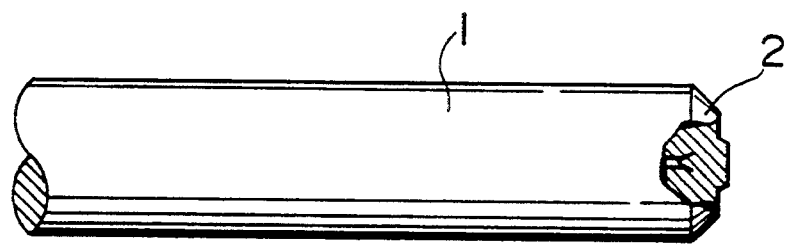
FIG. 2 is an illustration of the fuel rod after the completion of the welding process.

A first embodiment of the present invention will be explained with reference to FIGS. 1 and 2.

In the figures, the reference numeral 1 refers to a fuel tube for making a fuel rod which houses pellets and a coil spring. At each end of the fuel tube 1, an end plug 2 is inserted and joined to the tube by welding the peripheries. A (gas) seal opening 3 is formed on the upper end plug of the above two end plugs 2 for the fuel rod, and the exterior shape of the seal opening 3 is a conical opening 4 so as to enlarge its diameter as it extends outward away from the fuel rod.

The fuel rod of the above configuration is welded in a welding chamber C as follows. First, an inert gas He is charged into the fuel tube 1 from the seal opening 3 of the one end plug 2. Then, as shown in FIG. 1, a sealing material body 5 of a wire or rod shape, made of zircalloy which is the same material as the one end plug 2, is pushed up against the conical opening 4. The diameter of the wire 5, such as 2 mm diameter, is chosen so as to permit the wire 5 to be in contact with the conical opening 4. To be able to flow a large amount of current (example, several thousand amperes) concentrated in the pressed region, the vicinities of the end plug 2 and the wire 5 are clamped with contact electrodes 6, 7 made of such materials as copper alloys, and a large current is passed through. Then, while pressing the contact electrodes 6, 7 towards each other, the end plug 2 and the wire 5 are heated by the specific and contact resistance effects at the joint, and the temperature rises to induce welding in the joint region. Accordingly, due to the pressing force exerted on the joint region, the wire 5 is resistance welded with assistance from the force of pressing in the conical opening 4 so as to weld to the conical opening 4 to seal the gas seal opening 3, thus sealing the fuel rod under a specific gaseous pressure of the inert gas He maintained in the welding chamber C. When the above resistance welding operation is completed, the excess wire 5 is cut off to complete the welding operation as shown in FIG. 2. The wire 5 is forwarded by such method as pinch rollers to supply the wire for the next welding operation. Therefore, it becomes possible not only to perform every welding operation using the freshly cut surface of a wire 5, but also to use a long length of wire 5, thus enabling to weld a plurality of end plugs 2 continuously under stable welding conditions, thus opening a way to automating the welding process.

Figure 3:
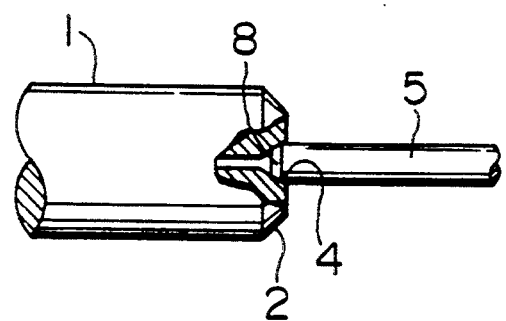
FIG. 3 is a variation of the first embodiment in which the welding end of the sealing material body is shaped to provide a plane contact with the conical gas seal opening.

In a variation of the first embodiment, it is also possible to shape the end of the wire 2 so as to provide a corresponding conical plane 8 for plane contact between the wire 5 and the conical opening 4 as illustrated in FIG. 3. By utilizing such a configurational arrangement, it provides a wider range of flexibility in the choice of joining conditions.

The present application claims the priority of Japanese patent application filed in Japan, No. H04-312467, on Nov. 20, 1992, which is herein incorporated by reference.

What is claimed is:

1. A method for resistance welding of a gas seal opening provided on an end plug of a fuel rod, comprising the steps of:
   (a) providing a fuel rod comprising a metal tube which houses pellets and a coil spring, and a pair of end plugs fixed in both ends of said metal tube, one of said end plugs having a gas seal opening formed through said end plug, and said gas seal opening containing a conical opening formed in an end thereof so as to enlarge its inner diameter as it extends outward away from said metal tube;
   (b) providing a sealing material body having a constant diameter being smaller than a maximum diameter of said conical opening and being larger then a minimum diameter of said conical opening;
   (c) pressing the sealing material body against said conical opening coaxially to each other;
   (d) passing a current through contact electrodes disposed on said sealing material body and on said metal tube so as to heat a joint between said sealing material body and said end plug, to cause resistance welding of said joint; and
   (e) cutting said sealing material body perpendicularly to center axis thereof.

2. A method as claimed in claim 1, wherein prior to steps (a) and (b), the metal tube is readied for loading fuel pellets, and is loaded with a plurality of fuel pellets, and is filled with an inert gas.

3. A method as claimed in claim 2, wherein said inert gas is selected from the group consisting of helium, argon and a mixture of helium and argon.

4. A method as claimed in either one of claims 1 or 2, wherein said method for resistance welding is carried out in a welding chamber filled with an inert gas to a specific gaseous pressure.

5. A method as claimed in claim 4, wherein said specific gaseous pressure is not less than one atmospheric pressure.

6. A method as claimed in claim 1, wherein said sealing material body is made of a material of a same composition as a composition of the end plug.

7. A method as claimed in claim 1, wherein said sealing material body is made of zircalloy.

8. A method of claimed in claim 1, wherein said sealing material body is a wire.

9. A method as claimed in claim 1, wherein said contact electrodes are made of a material selected from the group consisting of copper and copper alloys.

10. A method as claimed in claim 1, wherein the welding end of said sealing material body is shaped to correspond with a shape of said conical opening in advance.

11. A system for resistance welding of a gas seal opening provided on an end plug of a fuel rod, comprising:
   a fuel rod comprising a metal tube which houses pellets and a coil spring, and a pair of end plugs fixed in both ends of said metal tube, one of said end plugs having a gas seal opening formed through said end plug, and said gas seal opening containing a conical opening formed in an end thereof so as to enlarge its inner diameter as it extends outward away from said metal tube;
   a sealing material body having a constant diameter being smaller than a maximum diameter of said conical opening and being larger then a minimum diameter of said conical opening, wherein the sealing material body is pressed against said conical opening coaxially to each other;
   a current passing through contact electrodes disposed on said sealing material body and on said metal tube so as to heat a joint between said sealing material body and said end plug, to cause resistance welding of said joint.

12. A system as claimed in claim 11, wherein the metal tube is loaded with a plurality of fuel pellets and is filled with an inert gas.

13. A system as claimed in claim 12, wherein said inert gas is selected from the group selecting of helium, argon and a mixture of helium and argon.

14. A system as claimed in either one of claims 11 or 12, wherein said resistance welding is carried out in a welding chamber filled with an inert gas to a specific gaseous pressure.

15. A system as claimed in claim 14, wherein said specific gaseous pressure is not less than one atmospheric pressure.

16. A system as claimed in claim 11, wherein said sealing material body is made of a material of a same composition as a composition of the end plug.

17. A system as claimed in claim 11, wherein said sealing material body is made of zircalloy.

18. A system of claimed in claim 11, wherein said sealing material body is a wire.

19. A system as claimed in claim 11, wherein said contact electrodes are made of a material selected from the group consisting of copper and copper alloys.

20. A system as claimed in claim 11, wherein the welding end of said sealing material body is shaped to correspond with a shape of said conical opening in advance.

* * * * *